(No Model.) 3 Sheets—Sheet 2.

R. CRICHTON.
MACHINE FOR MAKING DRILLS OR AUGER BITS.

No. 417,410. Patented Dec. 17, 1889.

WITNESSES:
Donn Twitchell
C. Sedgwick

INVENTOR:
R. Crichton
BY
Munn & Co.
ATTORNEYS.

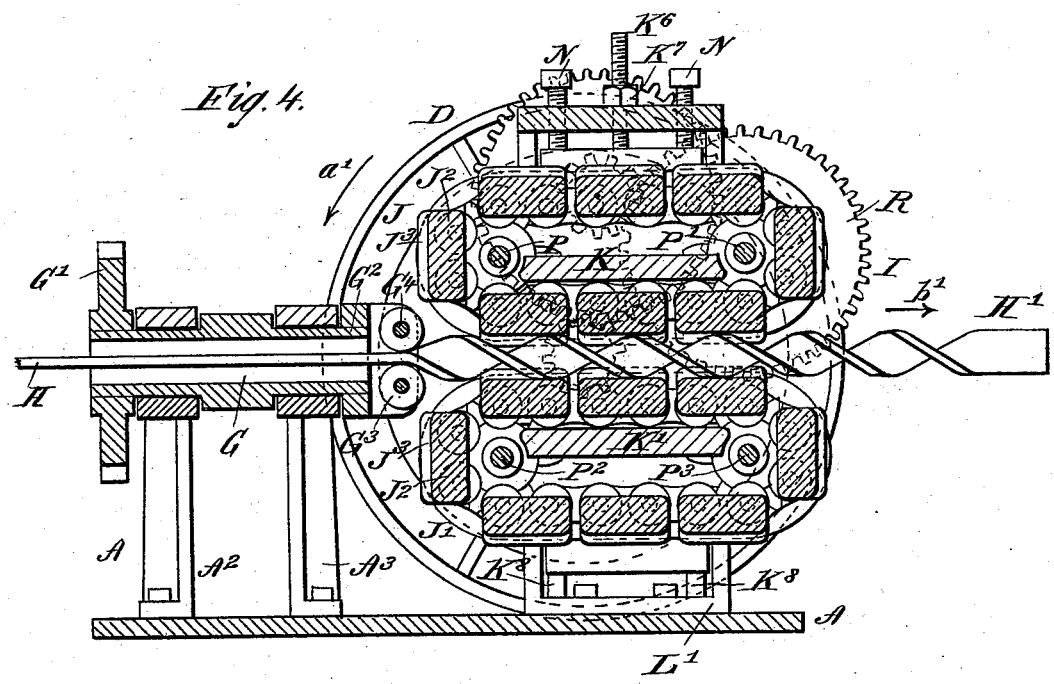
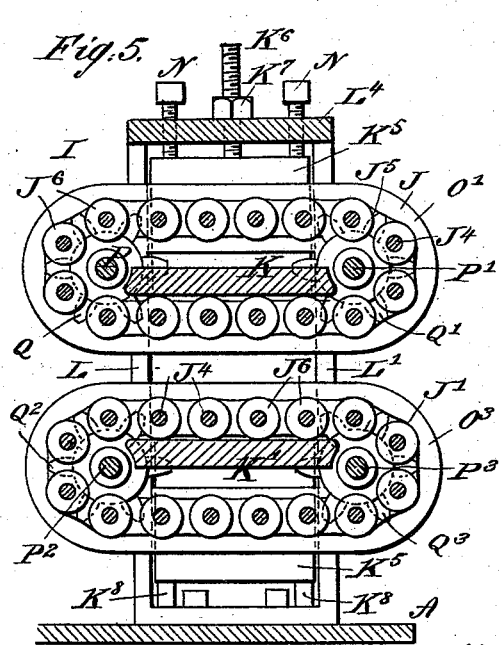
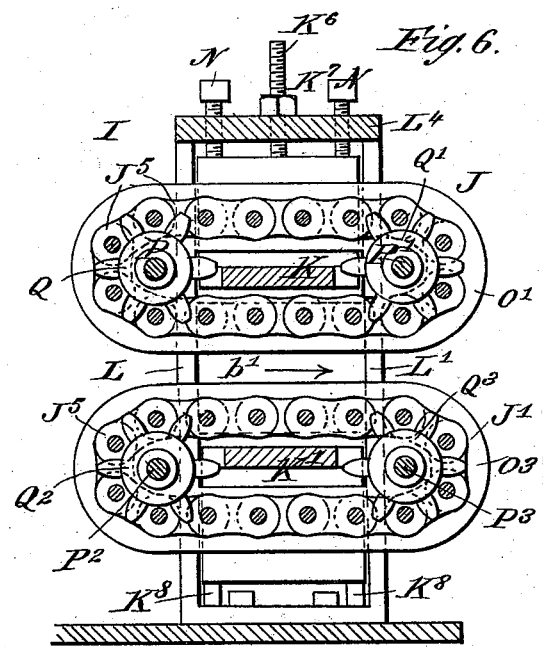
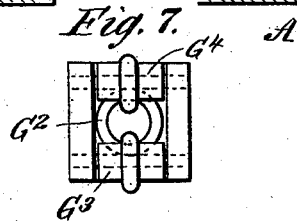

UNITED STATES PATENT OFFICE.

ROBERT CRICHTON, OF PARSONS, KANSAS.

MACHINE FOR MAKING DRILLS OR AUGER-BITS.

SPECIFICATION forming part of Letters Patent No. 417,410, dated December 17, 1889.

Application filed August 7, 1889. Serial No. 319,974. (No model.)

*To all whom it may concern:*

Be it known that I, ROBERT CRICHTON, of Parsons, in the county of Labette and State of Kansas, have invented a new and Improved Machine for Making Drills or Auger-Bits, of which the following is a full, clear, and exact description.

The object of the invention is to provide a new and improved machine which is simple and durable in construction and serves to conveniently twist a bar of any desired length into an auger-bit or twist-drill, said bar passing from the door of the furnace to the machine, so as to prevent any loss of heat; or the bar may pass directly from the rolls of a rolling-mill into the machine, so as to avoid reheating of the bar.

The invention consists of a tube mounted to turn and carrying a pair of twisting-rollers and traveling grippers for pulling the bar to be twisted through the said tube and rollers.

The invention also consists of certain parts and details and combinations of the same, as will be fully described hereinafter, and then pointed out in the claims.

Reference is to be had to the accompanying drawings, forming a part of this specification, in which similar letters of reference indicate corresponding parts in all the figures.

Figure 1:
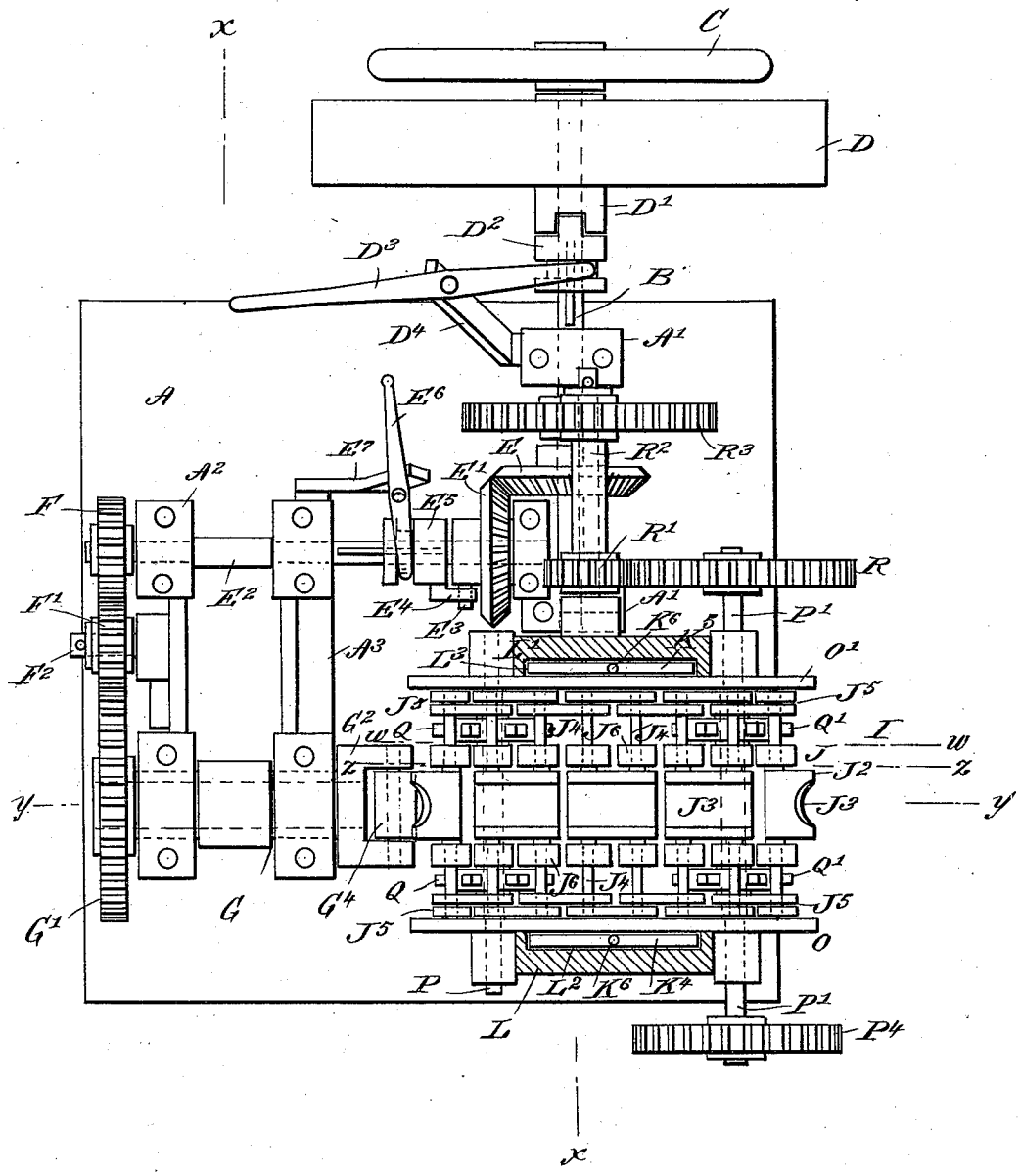
Figure 2:
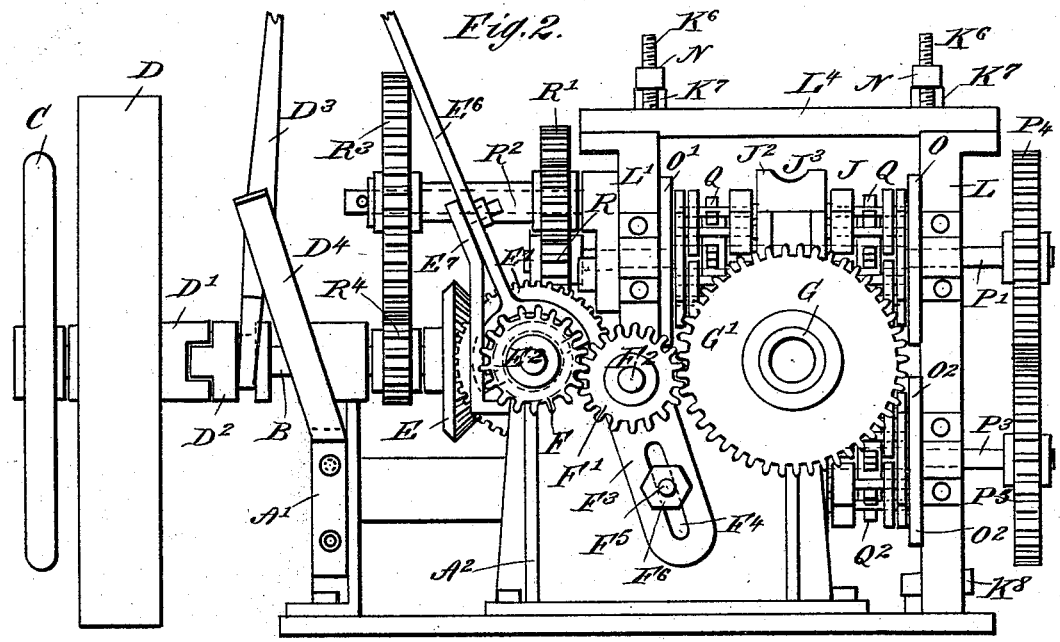
Figure 3:
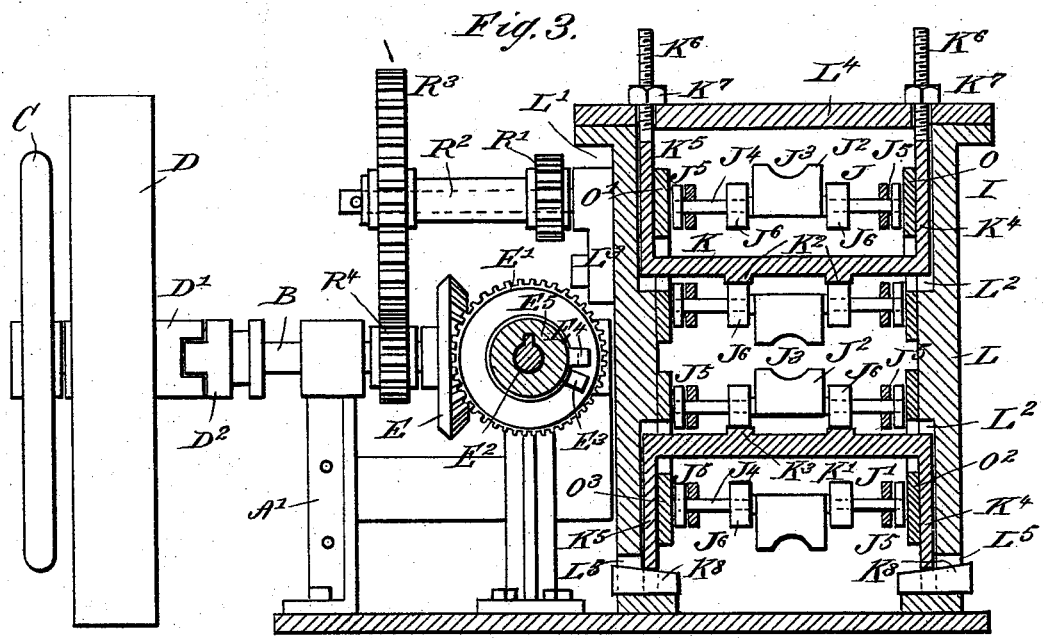

Figure 1 is a plan view of the improvement with parts in section. Fig. 2 is an end elevation of the same. Fig. 3 is a transverse section of the same on the line $x\ x$ of Fig. 1. Fig. 4 is a sectional side elevation of the same on the line $y\ y$ of Fig. 1. Fig. 5 is a sectional side elevation of part of the same on the line $z\ z$ of Fig. 1. Fig. 6 is a like view of the same on the line $w\ w$ of Fig. 1, and Fig. 7 is an end elevation of a set of twisting-rollers for twist-drills.

The improved machine for making drills or auger-bits is mounted on a suitably-constructed base A, on which are erected the standards A', in which is mounted to turn the main driving-shaft B, carrying on its outer end a hand-wheel C for turning the said shaft when necessary. On the main driving-shaft B is mounted to turn loosely the main driving-pulley D, connected by a belt with suitable machinery for transmitting motion to the machine. The hub D' of the said main driving-pulley B is formed into a clutch adapted to be engaged by a clutch $D^2$, held to slide on and to turn with the main driving-shaft B. The clutch $D^2$ is connected with a lever $D^3$ for shifting the said clutch $D^2$ into and out of contact with the hub D' of the pulley D. The lever $D^3$ is fulcrumed on a bracket $D^4$, secured to one of the standards A'. When the clutch $D^2$ engages the clutch D' the rotary motion of the pulley D is transmitted to the main driving-shaft B. On the inner end of the said shaft B is secured a bevel gear-wheel E, which meshes into a bevel gear-wheel E', held loosely on the inner end of a shaft $E^2$, standing at right angles to the main driving-shaft B, and mounted to turn in suitable bearings on the standards $A^2$ and $A^3$, erected on the base A. On the hub of the bevel gear-wheel E' is a pin $E^3$, adapted to engage a projecting arm $E^4$, mounted on a clutch $E^5$, held to slide on and to turn with the shaft $E^2$. The clutch $E^5$ is engaged by a lever $E^6$, fulcrumed on a bracket $E^7$, secured on the standard $A^2$. When the clutch $E^5$ is in the position shown in Fig. 1, its arm $E^4$ can be engaged by the pin $E^3$, so that the shaft $E^2$ is turned when the main driving-shaft B is in motion.

On the outer end of the shaft $E^2$ is secured a gear-wheel F, which meshes into an intermediate gear-wheel F', held to turn on a stud $F^2$, secured to an arm $F^3$, provided with a slot $F^4$, (see Fig. 2,) through which passes a bolt $F^5$, secured to the standard $A^2$. On the outer end of the bolt $F^5$ screws a nut $F^6$, for conveniently fastening said arm $F^3$ against the standard $A^2$. The slot $F^4$ permits an adjustment of the arm $F^3$ in any direction, so that different-sized intermediate gear-wheels F' may be held on the stud $F^2$ and in mesh with the gear-wheel F. A gear-wheel G' is also in mesh with the intermediate gear-wheel F', and is secured on the outer end of a hollow tube G, extending parallel with the shaft $E^2$ and mounted to turn in suitable bearings in the standards $A^2$ and $A^3$.

On the inner end of the tube G is secured a head $G^2$, in which are mounted to turn the twisting-rollers $G^3$ and $G^4$, placed parallel with each other and such distances apart as correspond with the thickness of the bar H, to be turned into a twist-drill or auger-bit, said bar H passing into the tube G either directly from the furnace in which the bar is heated or from one of the rolls of the rolling-mill, forming the bar into the shape previously to twisting.

In order to draw the bar H through the tube G and twisting-rollers $G^3$ and $G^4$, I provide the gripping device I, located in front of the tube G and in line with the same next to the head $G^2$. The gripping device I is provided with two sets of gripping-jaws J and J', arranged like endless belts, as is plainly shown in Figs. 4, 5, and 6, and located one above the other. As shown in the drawings, eight gripping-jaws $J^2$ form one set, but any desired number may be employed. Each of the gripping-jaws $J^2$ is provided on its outer surface with a groove $J^3$, which may be semicircular, as shown in the drawings, or obtuse or acute angled, according to the shape of the bar H under treatment. Each of the jaws $J^2$ is mounted on two shafts $J^4$, the several shafts of one set of gripping-jaws being connected with each other at each end by links $J^5$, forming endless chains.

Next to the jaws $J^2$ on each shaft $J^4$ are held friction-rollers $J^6$, adapted to travel on tracks $K^2$ and $K^3$, respectively, formed on the under or upper side of the plates K and K', respectively, around which pass the respective sets of gripper-jaws J or J'. The plates K and K' are preferably U-shaped, having their ends $K^4$ and $K^5$ fitted to slide in grooves $L^2$ and $L^3$, respectively, formed on the insides of standards L and L', arranged on the base-plate A. It is understood that the tracks $K^2$ on the plate K are on the under side, while the tracks $K^3$ on the plate K' are on top, so that the friction-rollers $J^6$ of the set of gripper-jaws J travel on the said tracks when in their lowermost position, while the friction-rollers $J^6$ on the set of gripper-jaws J' travel on the tracks $K^3$ when in their uppermost position.

On the ends $K^4$ and $K^5$ of the plate K are secured the bolts $K^6$, passing through corresponding apertures in the top plate $L^4$, connecting the standards L and L' with each other. A nut $K^7$ screws on each of the bolts $K^6$ on top of the said top plate $L^4$, and said nuts serve to move the plate K up or down to raise or lower the tracks $K^2$, and consequently the gripping-jaws $J^2$ when traveling in their lowermost position. The ends $K^4$ and $K^5$ of the plate K' extend downward and are engaged near their lower ends by wedges $K^8$, held to slide transversely in suitable grooves $L^5$, cut in the standards L and L'. The plate K' can by the said wedges $K^8$ be raised or lowered, so as to raise or lower the gripping-jaws $J^2$ of the set J' to any desired position in relation to the gripping-jaws of the set J. Against the upper edges of the ends $K^4$ and $K^5$ of the plate K abut the lower ends of the set-screws N, screwing in the top plate $L^4$. The set-screws N relieve the bolt $K^6$ and the nuts $K^7$ from all strain.

On the insides of the standards L and L' are secured the plates O O' and $O^2 O^3$, against which rest the outer sides of the links $J^5$, so as to hold the same in place. In suitable bearings in the standards L and L' are mounted to turn the shafts P P' and the shafts $P^2 P^3$, respectively, belonging to the sets of grippers J and J'. On the said shafts P, P', $P^2$, and $P^3$ are secured sprocket-wheels Q, Q', $Q^2$, and $Q^3$, respectively, over which pass the shafts $J^4$, carrying the gripping-jaws $J^2$. Said sprocket-wheels engage the said shaft between the friction-rollers $J^6$ and the links $J^7$, as is plainly shown in Fig. 1.

On one end of the shaft P' is secured a gear wheel $P^4$, which meshes into a gear-wheel $P^5$, secured on the shaft $P^3$. On the other end of the said shaft P' is secured a gear-wheel R, which meshes into a pinion R', secured on a shaft $R^2$, mounted to turn in suitable bearings secured to the standard L'. On the shaft $R^2$ is secured a gear-wheel $R^3$, which meshes into a pinion $R^4$, secured on the main driving-shaft B.

The operation is as follows: When the clutch $D^2$ is disengaged from the hub D' the latter runs loosely on the main driving-shaft B. When the clutch $E^5$ disconnects its arm $E^4$ from the pin $E^3$ and the clutch $D^2$ is thrown in gear with the hub D', the main shaft B is rotated, but the shaft $E^2$, as well as the tube G, remains still. The rotary motion of the shaft B in the direction of the arrow $a'$ (see Fig. 4) imparts motion by means of the pinion $R^4$, the gear-wheel $R^3$, the shaft $R^2$, the pinion R', and the gear-wheel R to the shaft P', carrying the sprocket-wheels Q', and the said shaft P', by the gear-wheels $P^4$ and $P^5$, imparts a rotary motion to the shaft $P^3$, carrying the sprocket-wheels $Q^3$. The said sprocket-wheels Q' and $Q^3$ of the sets of grippers J and J' are thus turned and impart a traveling motion to the endless chains composed of links $J^5$, so that the gripping-jaws $J^2$ of the sets of jaws J and J' are moved in the direction of the arrow $b'$. When the operator now moves the clutch $E^5$ to the right, so that its arm $E^4$ is engaged by the pin $E^3$, the shaft $E^2$ is rotated and a similar motion is imparted to the tube G by the gear-wheels F, F', and G'. When the operator inserts a bar into the tube G, it passes between the twisting-rollers $G^3$ and $G^4$, and from the latter into the moving gripping-jaws $J^2$ of the sets of gripping-jaws J and J'. The gripping-jaws $J^2$ are pressed against the said bar with such force as to hold the bar firmly in place, at the same time moving the bar forward, traveling with the said gripping-jaws in the direction of the arrow $b'$. As the end of the bar is clamped between two gripping-jaws, the turning motion of the tube G imparts a twist to the bar on account of the latter passing between the rollers $G^3$ and $G^4$.

Thus it will be seen that the bar H is moved forward in the direction of the arrow $b'$, and at the same time a twist is given to the bar by the rotation of the tube G and its twisting-rollers $G^3$ and $G^4$. The pitch of the twist depends on the number of revolutions the tube G makes in relation to the forward motion of the sets of jaws J and J', which motion of the latter is controlled by the main driving-shaft B. A number of revolutions of the tube G can be changed at pleasure by changing the intermediate gear-wheel F'', meshing into the gear-wheels F and G'. By thus being enabled to change the intermediate gear-wheel F' to any desired diameter the revolutions of the tube G can be increased or diminished, and consequently the pitch of the twist of the bar H can be accordingly increased or diminished. It is understood that the forward traveling motion of the gripping-jaws is not interfered with by changing the intermediate gear-wheel F' from one size to another. It is further understood that the two sets of gripping-jaws are pressed toward each other to any desired degree, so as to engage the bar H with more or less force, by adjusting the set-screws N and the nuts $K^7$ on the screw-rods $K^6$, and by adjusting the wedges $K^8$, as previously described. This adjustment moves the plates K and K' toward or from each other, so that the friction-rollers $J^6$, traveling on the said plates K', move the jaws $J^2$ nearer to or farther from each other, as desired.

When the operator desires to form a long shank H' on the bar H before making the twist, he moves the clutch $E^5$ so that its arm $E^4$ disengages the pin $E^3$. The tube G then remains at a standstill, and a bar H passed through the tube passes between the anti-friction rollers $J^3$ and $J^4$ and into the moving jaws without being turned. Any desired length of shank H' may thus be formed on the bar H—that is, any desired length may pass from the friction-rollers $J^3$ and $J^4$ to and through the jaws $J^2$, and when the desired length has been reached the operator moves the clutch $E^5$ to the right, so that its arm $E^4$ is engaged by the pin $E^3$ of the bevel gear-wheel E' constantly rotated with the main driving-shaft B. The shaft $E^2$ is thus turned and imparts a rotary motion to the tube G, which now commences to twist the bar H. When the clutch $D^2$ is disconnected from the clutch D' of the wheel D, the main shaft B remains at a standstill, and when a bar is now inserted in the tube G and passes to the rollers $G^3$ and $G^4$ the operator can give any desired length to the shank H' by turning the hand-wheel C in the direction of the arrow $a'$. When the desired length has been given to the shank, the operator moves both clutches $E^5$ and $D^2$ into contact with the respective clutch-bars, so that a twist is now formed just behind the shank H', in the same manner as previously described.

In making twist-drills the bar H is first rolled into the proper shape. The twisting-rollers $G^3$ and $G^4$ are provided with beads of proper size and adapted to run in the grooves of the round bar, so as to be capable of twisting the bar without any gripping-friction. (See Fig. 7.)

Having thus fully described my invention, I claim as new and desire to secure by Letters Patent—

1. The combination, with a tube mounted to turn and carrying a pair of twisting-rollers, of traveling grippers for pulling the bar to be twisted through the said tube and rollers, substantially as shown and described.

2. The combination, with a tube mounted to turn and carrying a pair of twisting-rollers, of sets of traveling gripping-jaws adapted to grip the bar to be twisted and pulling the same through the said tube and rollers, substantially as shown and described.

3. The combination, with a tube mounted to turn and carrying a pair of twisting-rollers, of sets of traveling gripping-jaws adapted to grip the bar to be twisted and pulling the same through the said tube and rollers, and means, substantially as shown and described, for adjusting the said sets of gripping-jaws, as set forth.

4. The combination, with two sets of gripping-jaws, each formed in the shape of an endless band mounted to travel, of a tube held to turn and in line with the opposite sides of the said endless gripping-jaws, and friction-rollers held in the said tube and turning with the same, substantially as shown and described.

5. The combination, with the adjustable plates K and K', of the sets of grippers J and J', substantially as shown and described.

6. The combination, with the adjustable plates K and K', provided with tracks, of the sets of grippers J and J', provided with rollers traveling on the said tracks, substantially as shown and described.

7. The combination, with a tube mounted to turn and twisting-rollers held in the said tube, of the adjustable plates K, provided with tracks, and the traveling sets of grippers J and J', provided with friction-rollers traveling on the said tracks, substantially as shown and described.

8. The combination, with a main driving-shaft, of a tube mounted to turn and operated from the said driving-shaft, friction-rollers held in the said tube, and sets of traveling grippers, mounted to travel and operated from the said main driving-shaft, substantially as shown and described.

9. The combination, with a main driving-shaft, of a tube mounted to turn and operated from the said driving-shaft, friction-rollers held in the said tube, sets of grippers mounted to travel and operated from the said main driving-shaft, and means, substantially as described, for regulating the speed of the said tube relative to the said main driving-shaft and sets of grippers, as set forth.

10. The combination, with the sprocket-wheels Q Q' and Q² Q³, of the sets of gripping-jaws J and J', mounted to travel on the said sprocket-wheels, substantially as shown and described.

11. The combination, with the sprocket-wheels Q Q' and Q² Q³, of the sets of gripping-jaws J and J', mounted to travel on the said sprocket-wheels, and means, substantially as described, for adjusting the said sets of gripping-jaws nearer to or farther from each other, as set forth.

12. The combination, with the main shaft and the gripping device I, operated from the said main shaft, of the shaft E², a loose gear-wheel held on the said shaft and operated from the main driving-wheel, a clutch for connecting the said gear-wheel with the said shaft, and a tube mounted to turn and operated from the said shaft E², substantially as shown and described.

13. The combination, with the main shaft and the gripping device I, operated from the said main shaft, of the shaft E², a loose gear-wheel held on the said shaft and operated from the main driving-shaft, a clutch for connecting the said gear-wheel with the said shaft, a tube mounted to turn and operated from the said shaft E², and rollers held in the said tube, substantially as shown and described.

14. The combination, with the main shaft and the gripping device I, operated from the said main shaft, of the shaft E², a loose gear-wheel held on the said shaft and operated from the main driving-shaft, a clutch for connecting the said gear-wheel with the said shaft, a tube mounted to turn and operated from the said shaft E², rollers held in the said tube, and means, substantially as described, for turning the said main driving-shaft, as set forth.

ROBERT CRICHTON.

Witnesses:
C. B. HOTCHKISS,
E. B. STEVENS.